United States Patent
Ihlar et al.

(10) Patent No.: US 12,022,327 B2
(45) Date of Patent: Jun. 25, 2024

(54) USER DATA TRAFFIC HANDLING

(71) Applicant: Telefonaktiebolaget LM Ericsson (publ), Stockholm (SE)

(72) Inventors: Marcus Ihlar, Älvsjö (SE); Miguel Angel Muñoz De La Torre Alonso, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 268 days.

(21) Appl. No.: 17/416,608

(22) PCT Filed: Dec. 17, 2019

(86) PCT No.: PCT/EP2019/085487
§ 371 (c)(1),
(2) Date: Jun. 21, 2021

(87) PCT Pub. No.: WO2020/127148
PCT Pub. Date: Jun. 25, 2020

(65) Prior Publication Data
US 2022/0086691 A1    Mar. 17, 2022

(30) Foreign Application Priority Data
Dec. 21, 2018   (EP) .................... 18382985

(51) Int. Cl.
*H04W 28/10*   (2009.01)
*H04L 9/40*    (2022.01)
(Continued)

(52) U.S. Cl.
CPC ......... *H04W 28/10* (2013.01); *H04W 12/033* (2021.01)

(58) Field of Classification Search
CPC ..... H04W 28/10; H04W 28/12; H04W 28/14; H04W 12/03; H04W 12/033; H04W 12/037
See application file for complete search history.

(56) References Cited

U.S. PATENT DOCUMENTS 7,257,557 B2 *   8/2007   Hulick .................. H04L 9/3231
                                               434/354
8,316,110 B1 *   11/2012  Deshmukh .......... G06F 11/1438
                                               709/202

(Continued)

FOREIGN PATENT DOCUMENTS

CN   107251476 A   10/2017
CN   107580324 A   1/2018
(Continued)

OTHER PUBLICATIONS

3GPP, "3rd Generation Partnership Project; Technical Specification Group Services and System Aspects; System Architecture for the 5G System; Stage 2 (Release 15) 3GPP TS 23.501 V15.4.0", 3GPP TS 23.501 V15.4.0, Dec. 2018, 1-236.
(Continued)

*Primary Examiner* — Jenee Holland
(74) *Attorney, Agent, or Firm* — Murphy, Bilak & Homiller, PLLC (57) ABSTRACT

A network node for user data traffic handling (UPF), receives (52, 112) traffic for an application, wherein the traffic is to be sent to a logical server associated with the application, wherein the logical server resides on a network server (10.4), and wherein the application has a corresponding application function (AF). On detecting (53, 113) that the received traffic includes an encrypted server name indication such that the associated logical server cannot be identified, the network node requests (55, 115) from the corresponding application function information identifying (Continued)

the application. In response to receiving (62, 117) information identifying said application, the network node subsequently handles the traffic (63, 118) based on the identified application.

20 Claims, 10 Drawing Sheets (51) Int. Cl.
*H04L 45/00* (2022.01)
*H04W 12/033* (2021.01)

(56) References Cited

U.S. PATENT DOCUMENTS

| | | | |
|---|---|---|---|
| 9,154,385 B1* | 10/2015 | Beyh | H04L 41/22 |
| 9,419,942 B1* | 8/2016 | Buruganahalli | H04L 63/06 |
| 9,521,032 B1* | 12/2016 | Worsley | G06F 21/305 |
| 9,525,660 B2 | 12/2016 | Martini et al. | |
| 9,768,952 B1* | 9/2017 | Allo | G06F 21/575 |
| 9,813,303 B1* | 11/2017 | Guigli | H04L 61/5014 |
| 10,084,712 B1* | 9/2018 | Li | H04L 43/026 |
| 10,158,651 B1 | 12/2018 | Nimry et al. | |
| 2001/0052083 A1* | 12/2001 | Willins | H04L 9/3213 |
| | | | 726/10 |
| 2002/0095487 A1* | 7/2002 | Day | H04L 61/00 |
| | | | 709/223 |
| 2003/0149880 A1* | 8/2003 | Shamsaasef | H04L 9/083 |
| | | | 713/182 |
| 2004/0194061 A1* | 9/2004 | Fujino | G06F 9/5083 |
| | | | 717/120 |
| 2005/0114653 A1* | 5/2005 | Sudia | H04L 9/3263 |
| | | | 713/158 |
| 2006/0136724 A1* | 6/2006 | Takeshima | H04L 63/0464 |
| | | | 713/168 |
| 2006/0212697 A1* | 9/2006 | Sato | G06F 21/10 |
| | | | 713/150 |
| 2006/0242263 A1* | 10/2006 | Sato | G06F 21/52 |
| | | | 709/217 |
| 2007/0143395 A1* | 6/2007 | Uehara | G06F 13/385 |
| | | | 709/203 |
| 2007/0276842 A1* | 11/2007 | Miyata | G06F 11/2041 |
| 2008/0235507 A1* | 9/2008 | Ishikawa | H04L 63/0428 |
| | | | 713/150 |
| 2010/0232605 A1* | 9/2010 | Kim | G08G 1/092 |
| | | | 380/255 |
| 2011/0191454 A1* | 8/2011 | Joukov | G06F 15/173 |
| | | | 709/223 |
| 2011/0202667 A1* | 8/2011 | Kimball | H04L 67/563 |
| | | | 709/228 |
| 2012/0089567 A1* | 4/2012 | Takahashi | G06F 21/6218 |
| | | | 707/634 |
| 2014/0150076 A1* | 5/2014 | Kimball | H04L 67/1021 |
| | | | 726/5 |
| 2014/0344925 A1* | 11/2014 | Muthiah | H04L 61/4511 |
| | | | 726/22 |
| 2015/0095377 A1* | 4/2015 | Kimball | H04L 67/563 |
| | | | 707/784 |
| 2015/0100551 A1* | 4/2015 | Kimball | G06F 21/33 |
| | | | 707/648 |
| 2015/0269186 A1* | 9/2015 | Kimball | G06F 16/1865 |
| | | | 709/217 |
| 2016/0080502 A1* | 3/2016 | Yadav | H04L 12/4633 |
| | | | 709/227 |
| 2016/0188901 A1* | 6/2016 | Kimball | G06F 21/6227 |
| | | | 707/784 |
| 2016/0241389 A1 | 8/2016 | Le Saint et al. | |
| 2017/0149841 A1* | 5/2017 | Antipa | H04L 63/308 |
| 2017/0237777 A1* | 8/2017 | Joch | H04L 63/1408 |
| | | | 713/152 |
| 2018/0123802 A1* | 5/2018 | Graul | H04L 63/0428 |
| 2018/0241488 A1* | 8/2018 | Daoura | H04W 4/70 |
| 2018/0270201 A1* | 9/2018 | Chanak | H04L 9/14 |
| 2018/0286207 A1* | 10/2018 | Baker | A24F 40/65 |
| 2018/0309723 A1* | 10/2018 | Ithal | H04L 63/0227 |
| 2018/0309795 A1* | 10/2018 | Ithal | H04L 69/22 |
| 2018/0330368 A1* | 11/2018 | Slupesky | H04L 67/02 |
| 2018/0332031 A1* | 11/2018 | Watanabe | H04L 9/3263 |
| 2018/0349569 A1* | 12/2018 | Taylor | G06F 21/6245 |
| 2018/0367574 A1* | 12/2018 | Verma | H04L 63/0236 |

FOREIGN PATENT DOCUMENTS

| | | | | |
|---|---|---|---|---|
| CN | 108737341 A | | 11/2018 | |
| EP | 1667398 A1 | | 6/2006 | |
| EP | 3614621 A1 | * | 2/2020 | H04L 9/32 |
| WO | 2018205148 A1 | | 11/2018 | |

OTHER PUBLICATIONS

3GPP, "3GPP TR 23.787 V0.3.0", 3rd Generation Partnership Project; Technical Specification Group Services and System Aspects; Study on encrypted traffic detection and verification (Release 16), Apr. 2018, 1-38.

3GPP, "3GPP TR 23.787 V0.4.0", 3rd Generation Partnership Project; Technical Specification Group Services and System Aspects; Study on encrypted traffic detection and verification (Release 16), Jun. 2018, 1-46.

3GPP, "3GPP TS 29.522 V15.1.0", 3rd Generation Partnership Project; Technical Specification Group Core Network and Terminals; 5G System; Network Exposure Function Northbound APIs; Stage 3 (Release 15), Sep. 2018, 1-29.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Motorola Mobility, et al., "Update of UE-Assisted Solution", SA WG2 Meeting #127, S2-184014, (revision of 82-183389), Sanya, P.R.China, 16-20, Apr. 2018, 1-12.

Rescorla, E., et al., "Encrypted Server Name Indication for TLS 1.3", draft-rescorla-tls-esni-00, tls, Internet-Draft, Intended status: Experimental, Jul. 2, 2018, 1-19.

* cited by examiner

USER DATA TRAFFIC HANDLING

TECHNICAL FIELD

This relates to the handling of user data traffic, in particular traffic that is to be sent to a network server comprising an application function, when the traffic includes an encrypted server name indication such that the application cannot be identified.

BACKGROUND

Traffic encryption is growing significantly in mobile networks and, at the same time, the encryption mechanisms are growing in complexity. It is recommended to encrypt traffic, for example for the sake of protecting the user's privacy.

A network provider uses traffic filters to detect traffic and apply the corresponding management or enforcement actions, such as charging, Quality of Service, etc.

An Over The Top (OTT) content provider communicates information to the network operator, so that the network operator is able to differentiate and classify the content provider's traffic appropriately. This information is contained in the standardized Packet Flow Description (PFD). This is a set of information enabling the detection of application traffic including: PFD id; a 3-tuple (including protocol, server-side IP address and port number); or the significant parts of the URL to be matched, e.g. host name; or a Domain name matching criteria (which refers to the Transport Layer Security (TLS) protocol, specifically to TLS Client Hello Server Name Indication).

The TLS protocol specifies an extension known as Server Name Indication (SNI). It is common for content servers to host multiple origins behind a single IP-address. The SNI extension was introduced in order to route application flows to the correct server without having to decrypt the entire flow. The SNI extension is sent by the client in the Client Hello message and contains a clear text string of the domain name of the server that the client is attempting to connect to. Since the SNI field is sent in clear text, it is commonly used by on-path network elements in order to classify flows.

In the TLS protocol TLS 1.3, it is proposed to encrypt the Server Name Indication (SNI) extension.

In addition, a User Datagram Protocol (UDP) based replacement for Transmission Control Protocol (TCP) is QUIC, which is a UDP-based, stream-multiplexing, encrypted transport protocol. QUIC relies on TLS 1.3, so QUIC based applications will also have the Server Name Indication (SNI) extension encrypted.

With the TLS SNI encrypted or obfuscated, the ability to differentiate traffic will be severely limited with the current PFD as defined by 3GPP, for TLS (1.3 and beyond) and/or QUIC based applications. If traffic differentiation is not possible, or severely limited, this will result in an impact on existing network operator use cases (such as Sponsored Data, QoS, Traffic Optimization, etc) for these applications.

SUMMARY

According to an aspect of the present invention, there is provided a method of operation of a network node for user data traffic handling. The method comprises: receiving traffic for an application, wherein the traffic is to be sent to a logical server associated with the application, wherein the logical server resides on a network server, and wherein the application has a corresponding application function (AF); detecting that the received traffic includes an encrypted server name indication such that the associated logical server cannot be identified; requesting from the corresponding application function information identifying the application; receiving information identifying said application; and handling the traffic based on the identified application.

According to an aspect of the present invention, there is provided a network node for user data traffic handling, configured to operate in accordance with the previous aspect.

According to an aspect of the present invention, there is provided a computer program, comprising instructions for causing the processor to perform the steps of the method of operation of the network node for user data traffic handling.

According to an aspect of the present invention, there is provided a method of operation of a network server comprising an application function. The method comprises: receiving from a network node for user data traffic handling a request for information identifying an application to which traffic relates; determining information identifying the application; and sending the information identifying said application to the network node for user data traffic handling.

According to an aspect of the present invention, there is provided a network server, configured to operate in accordance with the previous aspect.

According to an aspect of the present invention, there is provided a computer program, comprising instructions for causing the processor to perform the steps of the method of operation of the network server.

According to an aspect of the present invention, there is provided a method of operation of a network node for session management. The method comprises: receiving from a network node for user data traffic handling a message including a request for information identifying an application to which traffic relates, wherein the traffic includes an encrypted server name indication such that a logical server associated with the application cannot be identified; sending said request to a network server comprising an application function (AF) corresponding to the application; receiving said information identifying said application; and forwarding said information identifying said application to the network node for user data traffic handling.

According to an aspect of the present invention, there is provided a network node for session management, configured to operate in accordance with the previous aspect.

According to an aspect of the present invention, there is provided a computer program, comprising instructions for causing the processor to perform the steps of the method of operation of the network node for session management.

According to an aspect of the present invention, there is provided a method of operation of a network node for network exposure. The method comprises: receiving from a network node for session management a message including a request for information identifying an application to which traffic relates, wherein the traffic includes an encrypted server name indication such that a logical server associated with the application cannot be identified; sending said request to a network server comprising an application function (AF) corresponding to the application; receiving said information identifying said application; and forwarding said information identifying said application to the network node for session management.

According to an aspect of the present invention, there is provided a network node for network exposure, configured to operate in accordance with the previous aspect.

According to an aspect of the present invention, there is provided a computer program, comprising instructions for causing the processor to perform the steps of the method of operation of the network node for network exposure.

This has the advantage that a network node is able to handle traffic in an appropriate manner, even when the Server Name Indication is encrypted.

DETAILED DESCRIPTION

Figure 1:
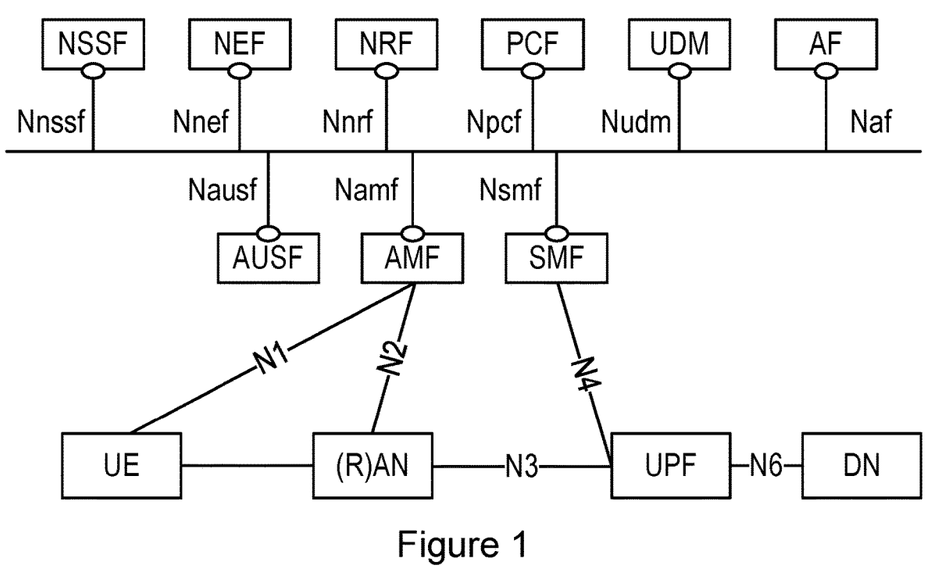
FIG. 1 is a block schematic diagram of a network architecture.

FIG. 1 illustrates a so-called 5G mobile communications network architecture, as defined in the 3GPP TS 23.501 v15.3.0.

This architecture has service-based interfaces in the control plane, implying that the interaction of the network functions is done by means of services. The network functions in the 5G control plane provide services that are consumed by other network functions in the 5G control plane.

The most relevant functional elements for the purposes of understanding this disclosure are the following:

PCF (Policy Control Function) supports unified policy framework to govern the network behaviour. It also implements a Front End (PCF FE) to access subscription information relevant for policy decisions in a Unified Data Repository (UDR). The PCF provides PCC (Policy and Charging Control) to the Policy and Charging Enforcement Function (PCEF) (SMF/UPF that enforces policy and charging decisions according to the PCCs.

SMF (Session Management Function) is responsible for Session establishment, modification and release, including selection and control of the UPF entities. SMF can provide to UPF information related to classification information obtained e.g. from the NEF, for the service classification of the user IP data. SMF interacts with the UPF over N4 Reference point using PFCP procedures.

UPF (User Plane Function) handles the user data traffic and optionally includes Deep Packet Inspection (DPI) functionality, which comprises inspecting and analyzing the contents of the IP data packets beyond the so-called IP 5 tuples. The IP 5 tuples consist of the heading elements of an IP data packet comprising: IP source address, IP destination address, source transport address, destination transport address, and protocol over IP (e.g. TCP, UDP). Therefore, put in short terms, DPI technology consists of inspecting and analyzing the application layer information conveyed by IP data packets. Because of the DPI analysis, service classification information can be obtained, which consists of IP packets being classified—i.e. after DPI processing—according to a configured tree of rules so that they are assigned to a certain service session.

NEF (Network Exposure Function) translates between information exchanged with the external Application Function (AF) and information exchanged with the internal network function(s). It is the Operator Network entry point for Application Service Providers (ASPs). This is a unique way of creating an interactive relationship between the service providers and network operators.

UDR (Unified Data Repository), not shown in FIG. 1, provides storage and retrieval of subscription data by the UDM (Unified Data Management, which is the evolution of HSS in the 5G architecture), storage and retrieval of policy data by the PCF and storage and retrieval of structured data for exposure, and application data (including Packet Flow Descriptions (PFDs) for application detection, application request information for multiple UEs), by the NEF.

The NEF Northbound (Nnef) interface resides between the NEF and the AF. It specifies RESTful APIs that allow the AF to access the services and capabilities provided by 3GPP network entities and securely exposed by the NEF. Thus, the Nnef reference point supports the following procedures:

Procedures for Monitoring

Procedures for Device Triggering

Procedures for resource management of Background Data Transfer

Procedures for CP Parameters Provisioning

Procedures for PFD Management

Procedures for Application Influence on traffic routing.

The further description herein relates to embodiments in which the method is performed in a 5G network architecture as shown in FIG. 1. However, the same mechanisms can be applied in other network architectures. For example, the mechanisms described herein can be performed in a 4G network architecture, by replacing:

NEF by a Service Capability Exposure Function (SCEF), which acts as a network node for network exposure, AF by a Service Capability Server/Application Server (SCS/AS), which acts as a network server comprising an application function, SMF by a Packet Data Network Gateway Control plane function (PGW-C) or a Traffic Detection Function for the Control plane (TDF-C), which acts as a network node for session management, UPF by a Packet Data Network Gateway User plane function (PGW-U) or a Traffic Detection Function for the User plane (TDF-U), which acts as a network node for user data traffic handling.

Traffic encryption is growing significantly in mobile networks and, at the same time, the encryption mechanisms are growing in complexity. Encryption is often recommended, for example by Over The Top (OTT) content providers, and by organisations such as the Internet Engineering Task Force (IETF) to encrypt traffic, mainly for the sake of protecting user's privacy.

The network operator uses traffic filters (which can be either locally configured or received from the content provider or application function through the Nnef interface) to detect traffic and apply the corresponding management and/or enforcement actions, such as charging, Quality of Service monitoring, etc.

The TLS protocol specifies an extension known as Server Name Indication (SNI). It is common for content servers to host multiple origins behind a single IP-address. The SNI extension was introduced in order to route application flows to the correct server without having to decrypt the entire flow. The SNI extension is sent by the client in the Client Hello message and may contain a clear text string of the domain name of the server that the client is attempting to connect to. If the SNI field is sent in clear text, it may be used by on-path network elements in order to classify flows.

However, an alternative possibility is to encrypt the Server Name Indication (SNI) extension, for example when using TLS 1.3 (and beyond) or QUIC, which relies on TLS 1.3.

If the TLS SNI encrypted or obfuscated, the current PFD as defined by 3GPP will not allow the network operator to differentiate traffic.

Figure 2A:
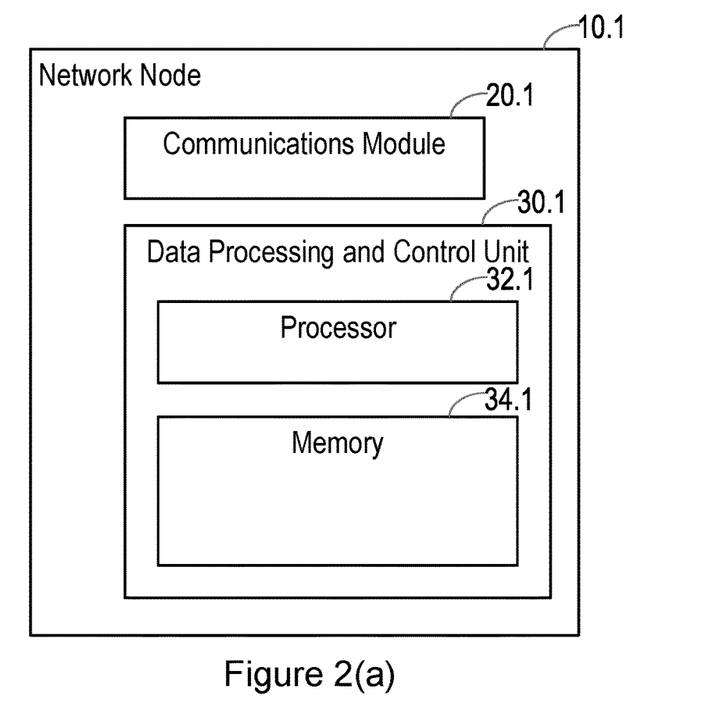
FIG. 2 comprises block diagrams showing network nodes in the network architecture of FIG. 1.

FIG. 2(a) is a block schematic diagram of a network node 10.1, more specifically a network node for user data traffic handling, for example a UPF (User Plane Function) network node in the architecture of FIG. 1.

The network node 10.1 comprises a communications module 20.1 and a data processing and control unit 30.1.

The communications module 20.1 is configured for communication using any required communications protocol, for example with other nodes of the architecture shown in FIG. 1.

The data processing and control unit 30.1 comprises a processor 32.1 and a memory 34.1. The memory 34.1 is configured for storing working data as required, and also for storing program instructions, and the processor 32.1 is configured for performing data processing and logical operations on the basis of program instructions stored in the memory 34.1. More specifically, the processor 32.1 may be programmed to perform the methods described herein. Although shown as respective single units, the processor 32.1 and the memory 34.1 may be implemented as multiple units, each carrying out a respective part of the required functionality.

Figure 2B:
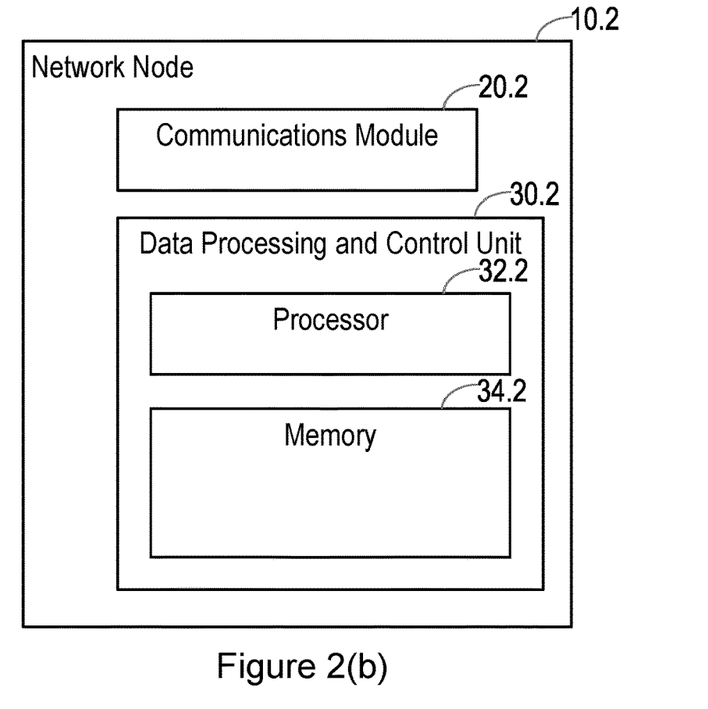

FIG. 2(b) is a block schematic diagram of a network node 10.2, more specifically a network node for session management, for example a SMF (Session Management Function) network node in the architecture of FIG. 1.

The network node 10.2 comprises a communications module 20.2 and a data processing and control unit 30.2.

The communications module 20.2 is configured for communication using any required communications protocol, for example with other nodes of the architecture shown in FIG. 1.

The data processing and control unit 30.2 comprises a processor 32.2 and a memory 34.2. The memory 34.2 is configured for storing working data as required, and also for storing program instructions, and the processor 32.2 is configured for performing data processing and logical operations on the basis of program instructions stored in the memory 34.2. More specifically, the processor 32.2 may be programmed to perform the methods described herein. Although shown as respective single units, the processor 32.2 and the memory 34.2 may be implemented as multiple units, each carrying out a respective part of the required functionality.

Figure 2C:
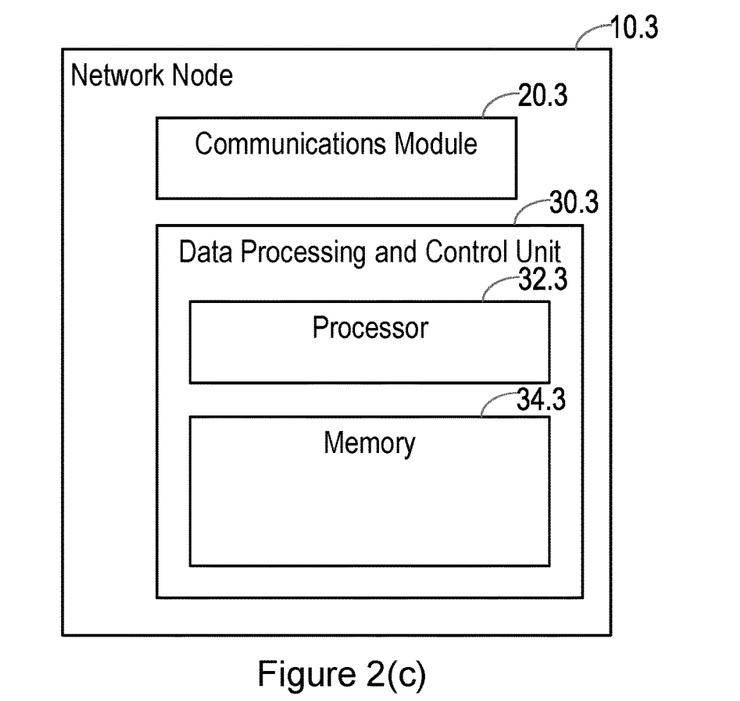

FIG. 2(c) is a block schematic diagram of a network node 10.3, more specifically a network node for network exposure, for example a NEF (Network Exposure Function) network node in the architecture of FIG. 1.

The network node 10.3 comprises a communications module 20.3 and a data processing and control unit 30.3.

The communications module 20.3 is configured for communication using any required communications protocol, for example with other nodes of the architecture shown in FIG. 1.

The data processing and control unit 30.3 comprises a processor 32.3 and a memory 34.3. The memory 34.3 is configured for storing working data as required, and also for storing program instructions, and the processor 32.3 is configured for performing data processing and logical operations on the basis of program instructions stored in the memory 34.3. More specifically, the processor 32.3 may be programmed to perform the methods described herein. Although shown as respective single units, the processor 32.3 and the memory 34.3 may be implemented as multiple units, each carrying out a respective part of the required functionality.

Figure 2D:
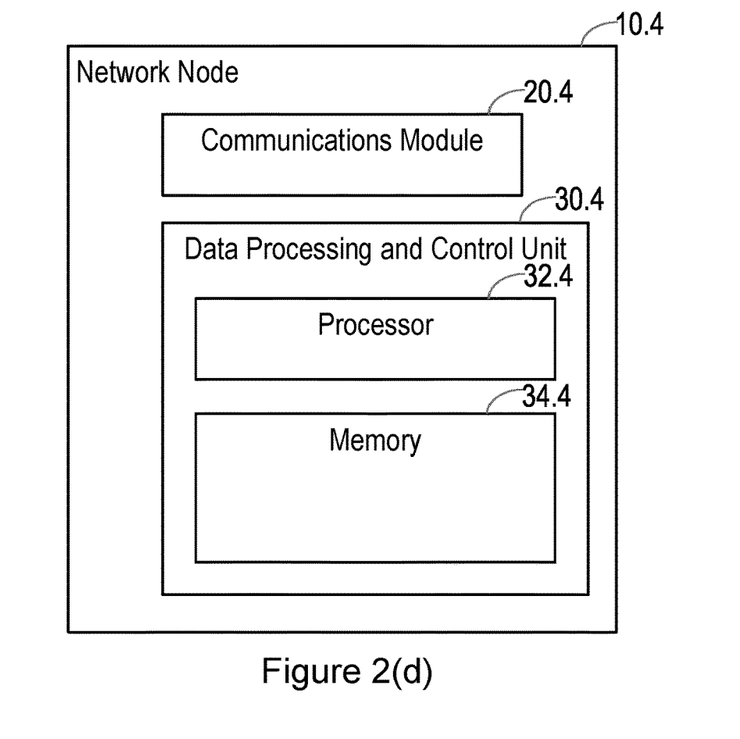

FIG. 2(d) is a block schematic diagram of a network node 10.4, for example a network server comprising an AF (Application Function) in the architecture of FIG. 1.

The network node 10.4 comprises a communications module 20.4 and a data processing and control unit 30.4.

The communications module 20.4 is configured for communication using any required communications protocol, for example with other nodes of the architecture shown in FIG. 1.

The data processing and control unit 30.4 comprises a processor 32.4 and a memory 34.4. The memory 34.4 is configured for storing working data as required, and also for storing program instructions, and the processor 32.4 is configured for performing data processing and logical operations on the basis of program instructions stored in the memory 34.4. More specifically, the processor 32.4 may be programmed to perform the methods described herein. Although shown as respective single units, the processor 32.4 and the memory 34.4 may be implemented as multiple units, each carrying out a respective part of the required functionality.

Methods are described herein, in which the network operator obtains from the content provider information identifying an application identifier for a certain user's application session using an encrypted SNI, allowing the network operator to differentiate the traffic as required. In particular, the network operator is able to differentiate between applications that use TLS 1.3 and beyond, specifically when the SNI is encrypted or obfuscated), and is therefore able to handle the traffic appropriately.

Two detailed embodiments are described, namely a control plane solution and a user plane solution.

Figure 3:
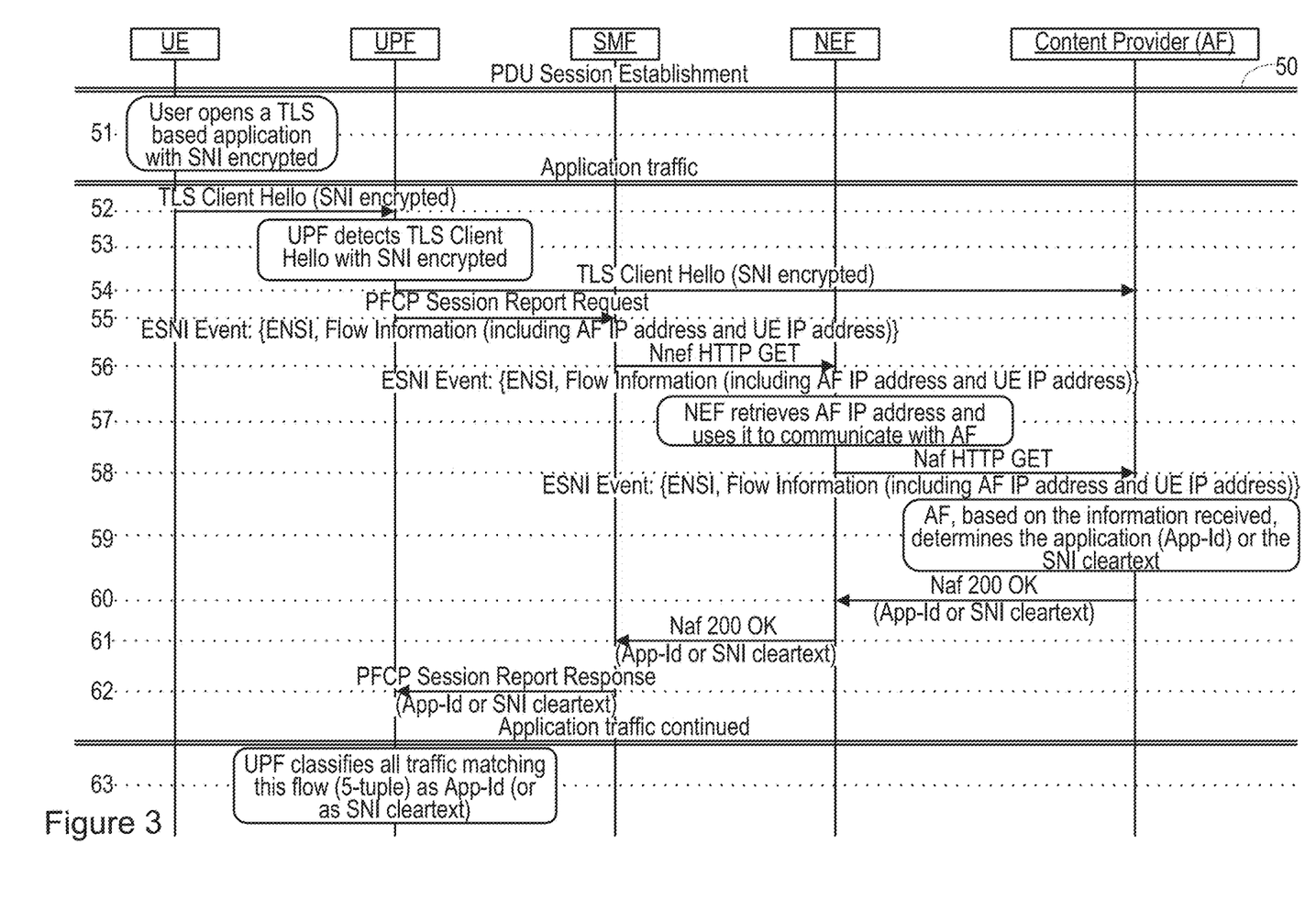
FIG. 3 is a signal flow diagram, illustrating a first method in accordance with the disclosure.

FIG. 3 is a signalling diagram, illustrating messages sent in the control plane solution. This aligns with the current 3GPP 5GC architecture and is based on extending the 3GPP Naf, Nnef and N4 interfaces by allowing the UPF to report the detected encrypted SNI (ESNI) and the flow information (5-tuple) to the AF (through the SMF and the NEF), so that the AF is able to determine the target application (App-Id) or the cleartext SNI, and send it back to the UPF, allowing the UPF to classify the traffic accordingly.

The sequence of messages shown in FIG. 3 assumes that a UE triggers a Protocol Data Unit (PDU) session establishment, as shown generally at step 50, in a conventional way.

As shown at step 51, the user starts an application (e.g. YouTube) based on a protocol, for example TLS 1.3 or above, or QUIC, which also relies on TLS 1.3. The protocol, i.e. TLS 1.3 for example, supports the encryption of the SNI extension.

The TLS protocol specifies an extension known as Server Name Indication (SNI). It is common for content servers to host multiple origins behind a single IP-address. Thus, while a network server has a single IP address, multiple logical servers can reside on the network server, with each application hosted on a separate logical server, having its own SNI. In order to be able to route application flows to the correct logical server without having to decrypt the entire flow, one possibility is know the SNI, and to be able to map this to an application ID. Another possibility is to use the SNI as an application identifier. A still further possibility is to have other information identifying the application. The flows can also be classified, using the SNI or other information identifying the application.

In this embodiment, when the UE sends the TLS Client Hello (or QUIC CHLO) message at step 52, the SNI is assumed to be encrypted (obfuscated), for example as described in IETF Internet-Draft "Encrypted Server Name Indication for TLS 1.3; draft-ietf-tls-esni-01", Rescorla, et al, September 2018. This implies that the existing domain name PFD rule is not valid to detect application traffic.

At step 53, the UPF detects an incoming packet corresponding to the TLS Client Hello including an encrypted SNI extension. The UPF then extracts and stores both the encrypted SNI string and the flow information (i.e. the 5-tuple, which includes both the UE IP address and the AF IP address). The encrypted SNI string should provide sufficient information that the network server comprising the AF can successfully decrypt the SNI value. The minimal information that needs to be provided to the network server is a reference to the public key used for encrypting the SNI value and the actual cipher text. Typically, the AF that serves the relevant application is provided on the network server that hosts the application. The network server is therefore the endpoint for the traffic, and will have access to the relevant public key.

At step 54, the UPF forwards the original packet (unmodified) to its original destination, namely the network server comprising the application function (AF) of the content provider.

At step 55, the UPF triggers towards the SMF a Packet Forwarding Control Protocol (PFCP) Session Report Request message to report a new type of event (that is, an ESNI event). This message includes the encrypted SNI string and the flow information (i.e. the 5-tuple, which includes both the UE IP address and the AF IP address). In response, at step 56, the SMF triggers towards the NEF a Nnef HTTP GET message including the encrypted SNI string and the flow information (i.e. the 5-tuple, which includes both the UE IP address and the AF IP address).

At step 57, the NEF retrieves the AF IP address, for use in communicating with the AF. At step 58, the NEF uses the retrieved AF IP address to trigger a Naf HTTP GET message towards the AF, including the encrypted SNI string and the flow information (i.e. the 5-tuple, which includes both the UE IP address and the AF IP address to which the message is being sent).

At step 59, the AF receives the Naf HTTP GET and, based on the information received, it determines information identifying the relevant application. In this illustrated embodiment, the AF is provided on the network server that hosts the application. The network server is one of the endpoints for the traffic flow, and so the AF should have access to the key (for example it may have been obtained during the session establishment) that allows it to decrypt the encrypted SNI.

At this point, there are two possibilities. Either the AF is the origin server, or it is not the origin server.

Figure 4:
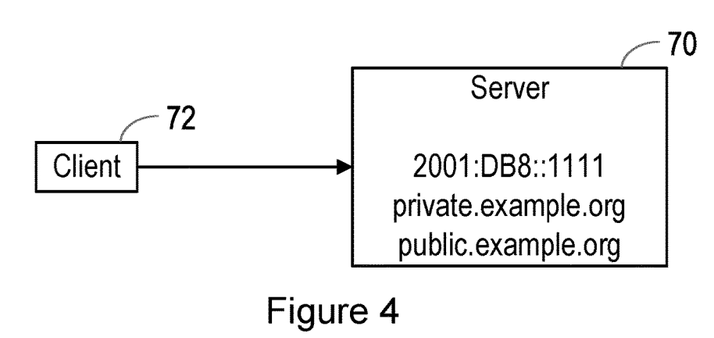
FIG. 4 illustrates a step in the method of FIG. 3, in one embodiment.

FIG. 4 is a schematic diagram, illustrating a shared mode topology, in which the provider is the origin server 70 for all the domains whose Domain Name System (DNS) records point to it, and clients, such as the client 72 shown in FIG. 4, form a TLS connection directly to that provider.

In this possibility, the AF is able to determine the application identifier, App-Id (e.g. App-Id=YouTube), for the relevant application.

Figure 5:
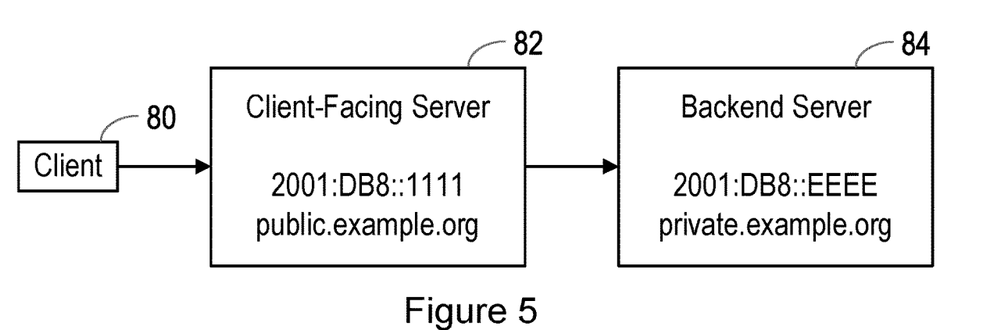
FIG. 5 illustrates a step in the method of FIG. 3, in another embodiment.

FIG. 5 is a schematic diagram, illustrating a split mode topology, in which the provider is not the origin server for private domains. Rather the DNS records for private domains point to the provider, so that clients, such as the client 80 shown in FIG. 5, are able to connect to the provider's client-facing server 82, but the server 82 just relays the connection back to the backend server 84, which is the true origin server.

In this possibility, the AF is not the origin server, and so it does not have enough information to directly determine the application identifier (App-Id). In this case, the AF is able to determine the cleartext SNI (e.g. youtube.com), as it has the ESNI keys as mentioned above, and this can serve as information identifying the relevant application.

Thus, at step 59, if the AF is the origin server, it is able to determine the application identifier. However, if the AF is not the origin server, it does not have enough information to directly determine the application identifier, but is able to determine the cleartext SNI to serve as information identifying the relevant application.

Then, at step 60, the AF answers the Naf HTTP GET message received in step 58 with a Naf 200 OK message including either the App-Id or the cleartext SNI. As an alternative, the AF may return an error response if it is unable to determine the information identifying the relevant application, for example because of an internal AF policy or because the AF was unable to parse the SNI string.

At step 61, the NEF answers the Nnef HTTP GET message received in step 56 with a Nnef 200 OK message including either the App-Id or the cleartext SNI.

At step 62, the SMF answers the PFCP Session Report Request message, received in step 55, with a PFCP Session Report Response message including either the App-Id or the cleartext SNI.

In addition, it can be noted here that, when the SMF receives the Nnef 200 OK message at step 61, and this message includes the App-ID, the SMF might install rules for subsequent handling of said traffic, for example updated QoS Enhancement Rules (QERs) and/or Usage Reporting Rules (URRs). The advantage of this is that it will save one hop, because the SMF is usually only able to take suitable actions, such as installing updated QERs/URRs, when the UPF notifies the SMF that traffic for a particular App-ID is detected.

Thereafter, at step 63, the UPF classifies all packets matching this flow (as determined by examining the 5-tuple) on the basis of the received information identifying the application, namely the application identifier (e.g. App-Id=YouTube) or the cleartext SNI, (e.g. youtube.com).

The traffic can then be handled on the basis of the identified application, for example according to existing Use Cases, such as ensuring guaranteed Quality of Service (QoS), performing appropriate Traffic Optimization, and allowing Sponsored Data, whereby a customer is able to stream data from a sponsor service provider without that data counting against the data allowance in their service plan.

Thus, FIG. 3 is a signalling diagram showing the control plane solution mentioned above.

Figure 6:
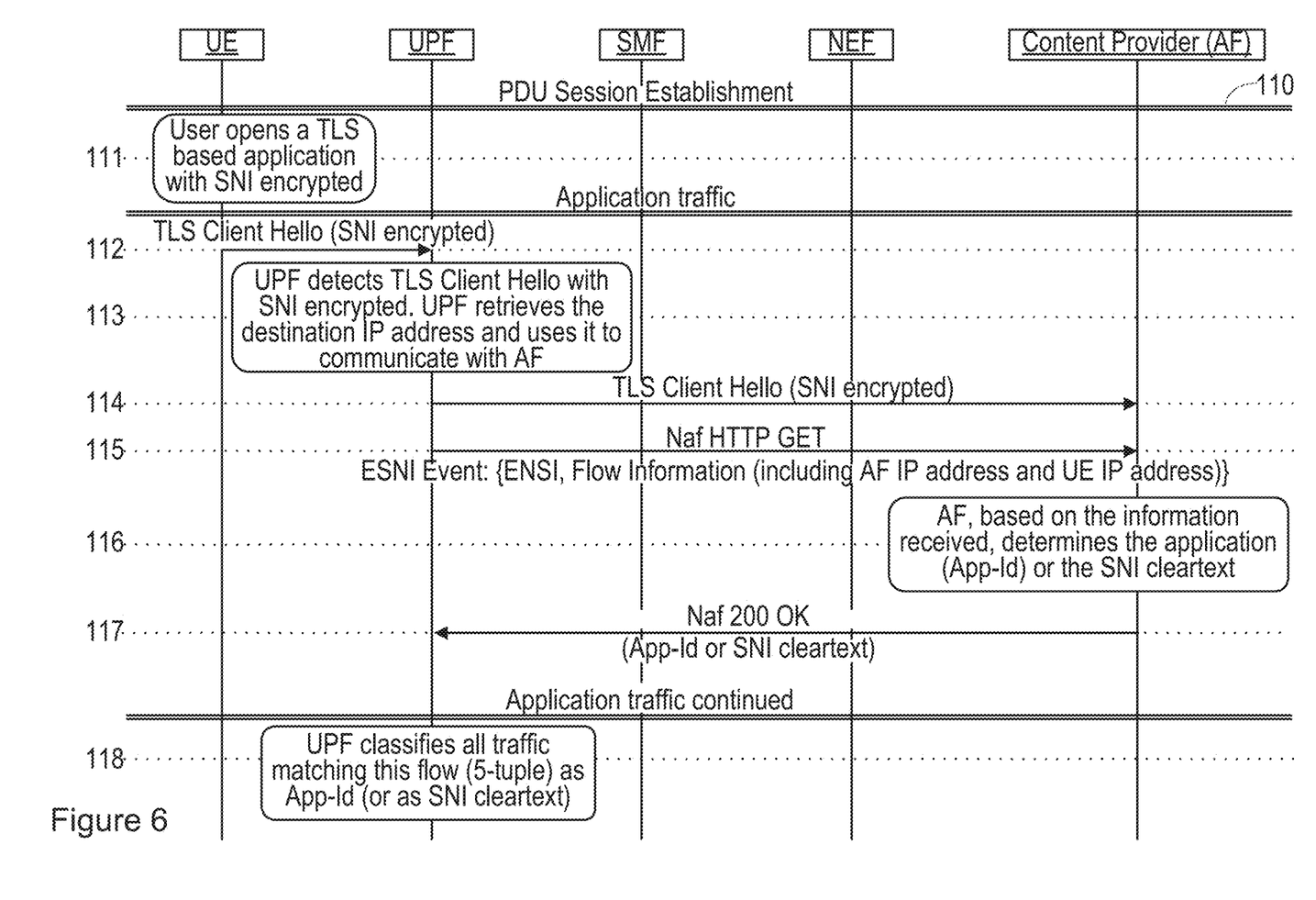
FIG. 6 is a signal flow diagram, illustrating a second method in accordance with the disclosure.

FIG. 6 is a signalling diagram, illustrating the alternative user plane solution. This is a simpler solution, but assumes UPF support for a Service Based Architecture (SBA) interface with the AF. In this case, as described in more detail below, the UPF will directly report the detected ESNI (encrypted SNI) and the flow information (5-tuple) to the AF, so that the AF is able to determine the information identifying the target application, which may be the application identifier (App-Id) or the cleartext SNI as described above, and send it back to the UPF, allowing the UPF to classify the traffic accordingly.

The sequence of messages shown in FIG. 6 assumes that a UE triggers a Protocol Data Unit (PDU) session establishment, as shown generally at step 110, in a conventional way.

As shown at step 111, the user starts an application (e.g. YouTube) based on a protocol, for example TLS 1.3 or above, or QUIC, which also relies on TLS 1.3. The protocol, i.e. TLS 1.3 for example, supports the encryption of the SNI extension.

Thus, when the UE sends the TLS Client Hello (or QUIC CHLO) message at step 112, the SNI is assumed to be encrypted (obfuscated), for example as described in IETF Internet-Draft "Encrypted Server Name Indication for TLS 1.3; draft-ietf-tls-esni-01", Rescorla, et al, September 2018. This implies that the existing domain name PFD rule is not valid to detect application traffic.

At step 113, the UPF detects an incoming packet corresponding to the TLS Client Hello including an encrypted SNI extension. The UPF then extracts and stores both the encrypted SNI string and the flow information (i.e. the 5-tuple, which includes both the UE IP address and the AF IP address). The encrypted SNI string should provide sufficient information that the network server comprising the AF can successfully decrypt the SNI value. The minimal information that needs to be provided to the network server is a reference to the public key used for encrypting the SNI value and the actual cipher text. Typically, the AF that serves the relevant application is provided on the network server that hosts the application. The network server is therefore the endpoint for the traffic, and will have access to the relevant public key.

At step 114, the UPF forwards the original packet (unmodified) to its original destination, namely the network server comprising the application function (AF) of the content provider.

At step 115, the UPF retrieves the AF IP address and uses it to trigger a Naf HTTP GET message towards the AF, including the encrypted SNI string and the flow information (i.e. the 5-tuple, which includes both the UE IP address and the AF IP address to which the message is being sent). As mentioned above, this assumes that the UPF supports an SBA interface towards the AF.

At step 116, the AF receives the Naf HTTP GET and, based on the information received, it determines information identifying the relevant application. In this illustrated embodiment, the AF is provided on the network server that hosts the application. The network server is one of the endpoints for the traffic flow, and so the AF should have access to the key (for example it may have been obtained during the session establishment) that allows it to decrypt the encrypted SNI.

As described with reference to FIGS. 4 and 5 above, either the AF is the origin server, or it is not the origin server. If the AF is the origin server, it is able to determine the application identifier. However, if the AF is not the origin server, it does not have enough information to directly determine the application identifier, but, as the AF is one of the endpoints for the traffic flow, it should have obtained the key that allows it to decrypt the encrypted SNI, and therefore to determine the cleartext SNI to serve as information identifying the relevant application.

Then, at step 117, the AF answers the Naf HTTP GET message received in step 116 with a Naf 200 OK message including either the App-Id or the cleartext SNI. As an alternative, the AF may return an error response if it is unable to determine the information identifying the relevant application, for example because of an internal AF policy or because the AF was unable to parse the SNI string.

Thereafter, as shown at step 118, the UPF classifies all packets matching this flow (as determined by examining the 5-tuple) on the basis of the received information identifying the application, namely the application identifier (e.g. App-Id=YouTube) or the cleartext SNI, (e.g. youtube.com).

The traffic can then be handled on the basis of the identified application, for example according to existing Use Cases, such as ensuring guaranteed Quality of Service (QoS), performing appropriate Traffic Optimization, and allowing Sponsored Data, whereby a customer is able to stream data from a sponsor service provider without that data counting against the data allowance in their service plan.

In the embodiments shown in FIGS. 3 and 6, it is assumed that the application function (AF) that corresponds to the application is provided on the same network server that comprises the logical server associated with the application. However, this is not necessarily the case.

In some embodiments, the application function (AF) that corresponds to the application is provided on a different node (for example a different network server). Thus, in this case, the AF is not one of the endpoints in the UE-server interaction. In such embodiments, the request for information identifying the application may be sent to the AF, but this is provided on a different network server from the network server on which the logical server associated with the application resides.

In such embodiments, the request for information identifying the application can be sent to the correct AF even though the destination IP address of the traffic flow does not identify the network server on which the AF is provided. For example, for some applications, the content provider may have supplied information to the network operator, allowing the network operator to identify the correct AF from the destination IP address of the traffic flow. As another example, there may exist a mapping between a prefix of the destination IP address and an IP address of an AF to which the request for information should be sent. For example, if the TLS handshake indicates a destination IP address in the form A.B.C.D, with an encrypted SNI, the network operator may be provided with a mapping stating that all flows having an encrypted SNI and towards IP addresses with the prefix A.B.x.x should trigger a request to a specific AF at a known IP address. As a further example, if the network operator does not have such a mapping between the prefix of the IP address and the AF, the request for information can still be sent to the IP address obtained in the TLS handshake. Since the network server indicated by the destination IP address and the relevant AF are provided by the same content provider, this request sent to the IP address obtained in the TLS handshake would likely return a redirection to the proper server that handles these requests.

FIGS. 3 and 6 also illustrate the case of an application with a single flow (i.e. one TCP and one TLS connection). However, the same solution also applies for applications with multiple flows (i.e. multiple TCP and multiple TLS connections).

Figure 7:
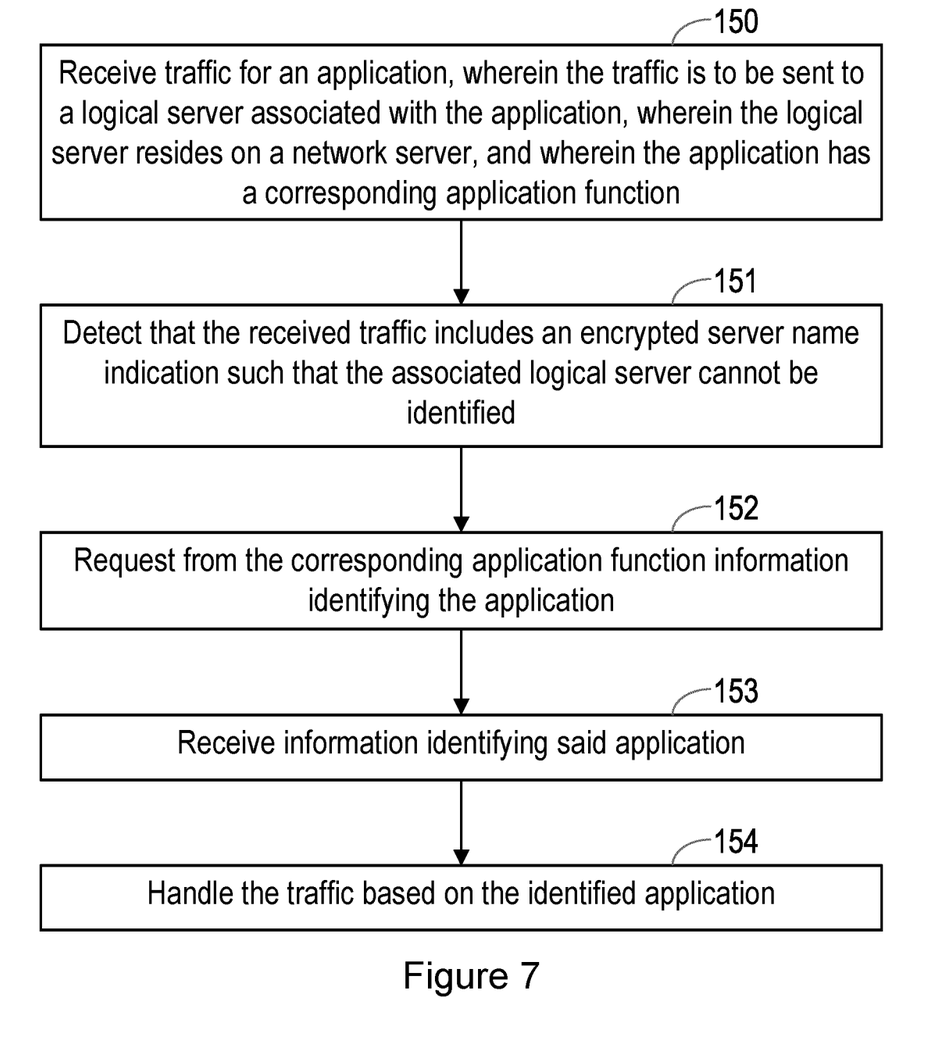
FIG. 7 is a flow chart, illustrating a first method.

FIG. 7 is a flow chart, illustrating in general terms a method of operation of a network node for user data traffic handling as disclosed herein.

The method comprises, at step 150, receiving traffic for an application, wherein the traffic is to be sent to a logical server associated with the application, wherein the logical server resides on a network server, and wherein the application has a corresponding application function. At step 151, the network node detects that the received traffic includes an encrypted server name indication such that the associated logical server cannot be identified. At step 152, the network node requests from the corresponding application function information identifying the application. At step 153, the network node receives information identifying said application and, thereafter, as shown at step 154, the network node handles the traffic based on the identified application.

Figure 8:
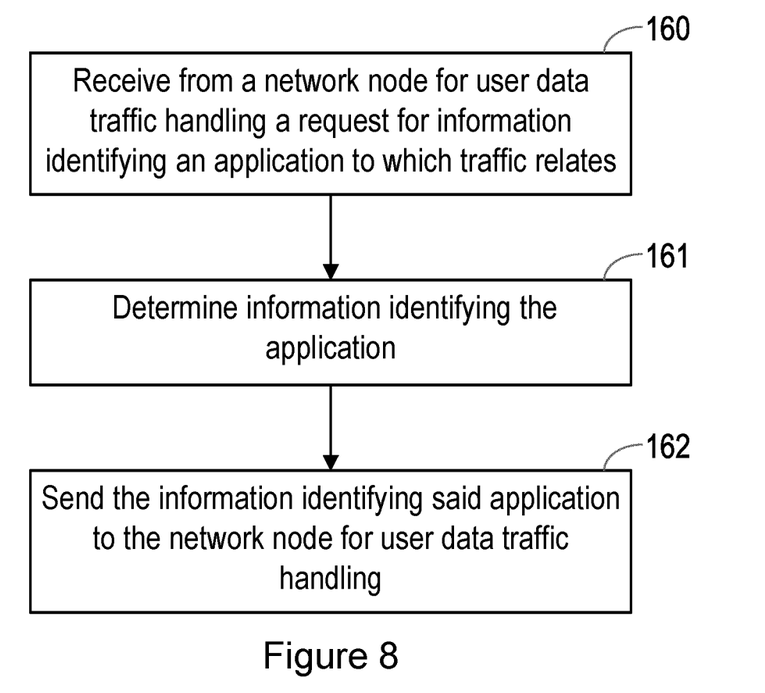
FIG. 8 is a flow chart, illustrating a second method.

FIG. 8 is a flow chart, illustrating in general terms a method of operation of a network server comprising an application function as disclosed herein.

The method comprises, at step 160, receiving from a network node for user data traffic handling a request for information identifying an application to which traffic relates. At step 161, the network server determines information identifying the application. At step 162, it sends the information identifying said application to the network node for user data traffic handling.

Figure 9:
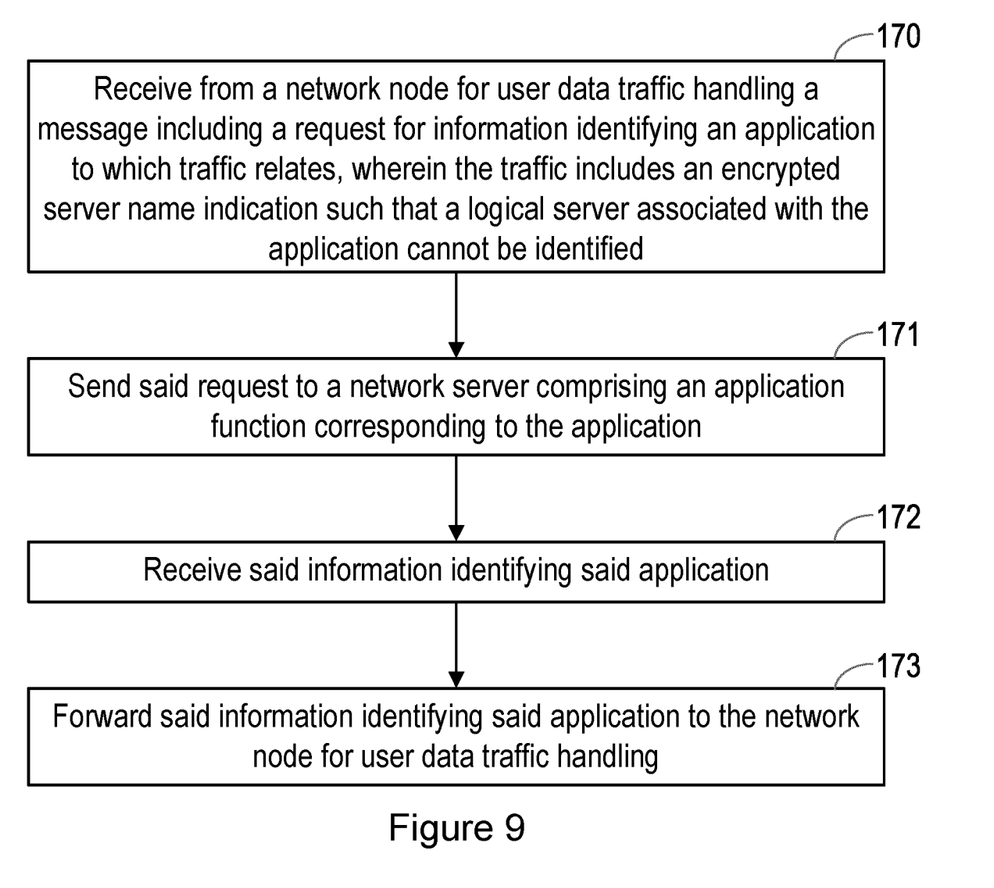
FIG. 9 is a flow chart, illustrating a third method.

FIG. 9 is a flow chart, illustrating in general terms a method of operation of a network node for session management as disclosed herein.

The method comprises, at step 170, receiving from a network node for user data traffic handling a message including a request for information identifying an application to which traffic relates, wherein the traffic includes an encrypted server name indication such that a logical server associated with the application cannot be identified. At step 171, the network node for user data traffic handling sends said request to a network server comprising an application function corresponding to the application. At step 172, it receives said information identifying said application, and, at step 173, it forwards said information identifying said application to the network node for user data traffic handling.

Figure 10:
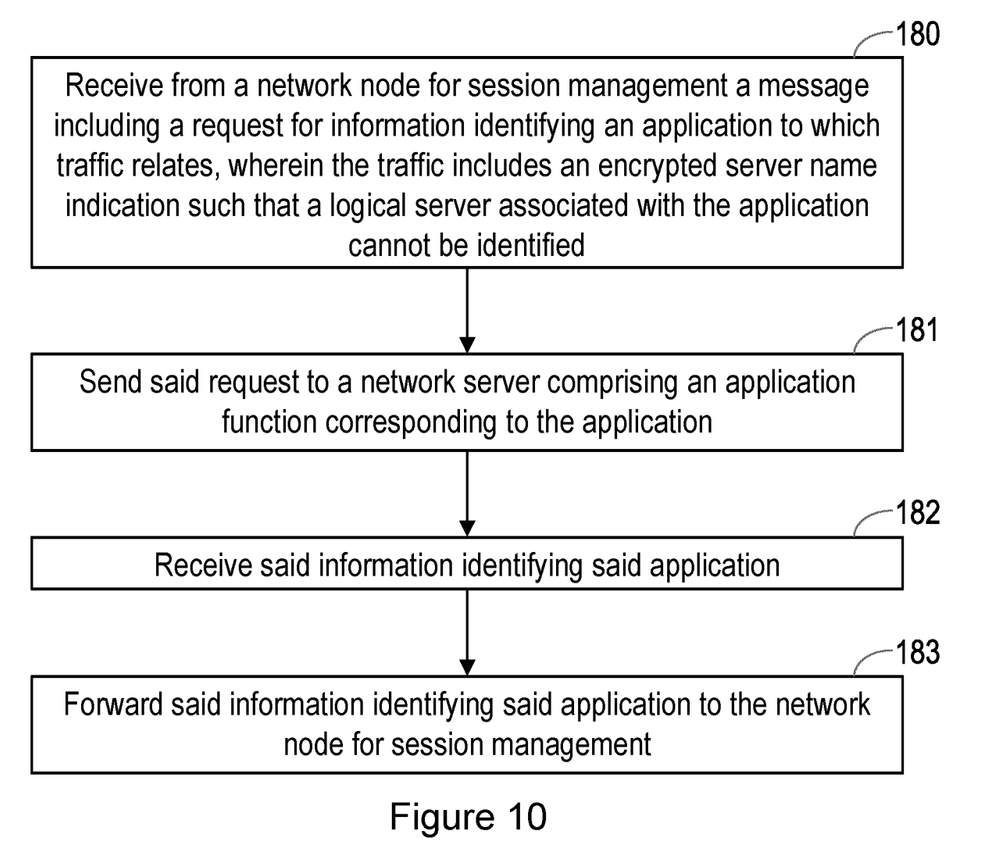
FIG. 10 is a flow chart, illustrating a fourth method.

FIG. 10 is a flow chart, illustrating in general terms a method of operation of a network node for network exposure as disclosed herein.

The method comprises, at step 180, receiving from a network node for session management a message including a request for information identifying an application to which traffic relates, wherein the traffic includes an encrypted server name indication such that a logical server associated with the application cannot be identified. At step 181, the network node for network exposure sends said request to a network server comprising an application function corresponding to the application. At step 182, it receives said information identifying said application, and, at step 183, it forwards said information identifying said application to the network node for session management.

There is thus described a system that allows a network node to handle traffic in an appropriate manner, even when the Server Name Indication is encrypted.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

ABBREVIATIONS

Abbreviation Explanation

AF Application Function
CHLO Client Hello
ESNI Encrypted Server Name Indication
IE Information Element
MNO Mobile Network Operator
NEF Network Exposure Function
NR Next Generation Radio/New Radio
OTT Over the Top
PCF Policy Control Function
PCRF Policy Control Rules Function
PFD Packet Flow Description
PGW Packet Gateway
PGW-C PDN Gateway Control plane function
PGW-U PDN Gateway User plane function
SBA Service Based Architecture
SCEF Service Capability Exposure Function
SCS/AS Service Capability Server/Application Server
SMF Session Management Function
SNI Server Name Indication
TLS Transport Layer Security
UE User Equipment
UPF User Plane Function

The invention claimed is:

1. A method of operation of a network node for user data traffic handling, the method comprising:
   receiving traffic for an application, wherein the traffic is to be sent to a logical server associated with the application, wherein the logical server resides on a network server, and wherein the application has a corresponding application function;
   detecting that the received traffic includes an encrypted server name indication encrypting a server name indication of the associated logical server, such that the encrypted server name indication cannot be decrypted by the network node;
   transmitting a request that requests, from the corresponding application function, information identifying the application, wherein the request comprises the encrypted server name indication, the encrypted server name indication being configured to be decrypted by the corresponding application function for identifying the application;
   receiving information identifying said application; and
   handling the traffic based on the identified application.

2. The method according to claim 1, wherein the request further comprises flow information.

3. The method according to claim 2, wherein the flow information comprises an address of a user device related to the traffic.

4. The method according to claim 1, wherein transmitting the request comprises transmitting the request to a network node for session management and wherein receiving the information identifying said application comprises receiving the information identifying said application from the network node for session management.

5. The method according to claim 1, wherein transmitting the request comprises transmitting the request to the corresponding application function directly and wherein receiving the information identifying said application comprises receiving the information identifying said application from the corresponding application function directly.

6. A network node for user data traffic handling, the network node comprising:

a processor; and a memory, the memory storing instructions executable by the processor whereby the network node is configured to:

receive traffic for an application, wherein the traffic is to be sent to a logical server associated with the application, wherein the logical server resides on a network server, and wherein the application has a corresponding application function;

detect that the received traffic includes an encrypted server name indication encrypting a server name indication of the associated logical server, such that the encrypted server name indication cannot be decrypted by the network node;

transmit a request that requests, from the corresponding application function, information identifying the application, wherein the request comprises the encrypted server name indication, the encrypted server name indication being configured to be decrypted by the corresponding application function for identifying the application;

receive information identifying said application; and handle the traffic based on the identified application.

7. The network node according to claim 6, wherein the request further comprises flow information.

8. The network node according to claim 7, wherein the flow information comprises an address of a user device related to the traffic.

9. The network node according to claim 6, the memory storing instructions executable by the processor whereby the network node is configured to transmit the request to a network node for session management and receive the information identifying said application from the network node for session management.

10. The network node according to claim 6, the memory storing instructions executable by the processor whereby the network node is configured to transmit the request to the corresponding application function directly and receive the information identifying said application from the corresponding application function directly.

11. The network node according to claim 6, wherein the received information identifying said application comprises an application identifier.

12. The network node according to claim 6, wherein the received information identifying said application comprises an unencrypted server name indication of the logical server associated with the application.

13. The network node according to claim 6, wherein the traffic is for an Internet Engineering Task Force (IETF) Transport Layer Security (TLS) 1.3 application or for a Quick User Datagram Protocol (UDP) Internet Connections (QUIC) application.

14. A network server comprising:
a processor; and
a memory, the memory storing instructions executable by the processor whereby the network server is configured to:

receive, from a network node for user data traffic handling, a request for information identifying an application to which traffic relates, the application being associated with a logical server resided on the network server, wherein the request comprises an encrypted server name indication encrypting a server name indication of the logical server;

determine information identifying the application to which traffic relates by decrypting the encrypted server name indication; and send the information identifying said application to the network node for user data traffic handling.

15. The network server according to claim 14, the memory storing instructions executable by the processor whereby the network server is configured to receive the request from a network node for network exposure and transmit the information identifying said application to the network node for network exposure.

16. The network server according to claim 14, the memory storing instructions executable by the processor whereby the network server is configured to receive the request directly from the network node for user data traffic handling and transmit the information identifying said application to which traffic relates directly to the network node for user data traffic handling.

17. The network server according to claim 14, wherein the information identifying said application to which traffic relates comprises an application identifier.

18. The network server according to claim 14, wherein the information identifying said application to which traffic relates comprises an unencrypted server name indication of a-the logical server associated with the application.

19. The network server according to claim 14, wherein the traffic is for an Internet Engineering Task Force (IETF) Transport Layer Security (TLS) 1.3 application or for a Quick User Datagram Protocol (UDP) Internet Connections (QUIC) application.

20. A method of operation of a network server comprising an application function corresponding to an application, the method comprising:

receiving, from a network node for user data traffic handling, a request for information identifying the application to which traffic relates, the application being associated with a logical server resided on the network server, wherein the request comprises an encrypted server name indication encrypting a server name indication of the logical server;

determining information identifying the application to which traffic relates by decrypting the encrypted server name indication; and sending, to the network node for user data traffic handling, the information identifying said application to which traffic relates.

* * * * *